United States Patent [19]

Fleming

[11] 4,254,700
[45] Mar. 10, 1981

[54] DOMESTIC APPLIANCE FOR THE LIQUID INJECTION OF MEAT

[76] Inventor: Edward H. Fleming, 709 Suffield St., Agawam, Mass. 01001

[21] Appl. No.: 79,472

[22] Filed: Sep. 27, 1979

[51] Int. Cl.³ .......................... A23L 1/31; A23L 3/34
[52] U.S. Cl. ........................................ 99/532; 99/535
[58] Field of Search .................. 99/494, 516, 532, 533, 99/535; 17/25

[56] References Cited

U.S. PATENT DOCUMENTS 3,916,777  11/1975  Earl ........................................ 99/533

FOREIGN PATENT DOCUMENTS 2749113  5/1979  Fed. Rep. of Germany ............. 99/532

Primary Examiner—Harvey C. Hornsby
Assistant Examiner—Timothy F. Simone
Attorney, Agent, or Firm—Ross, Ross & Flavin

[57] ABSTRACT

An appliance for domestic use in pre-basting, seasoning and tenderizing meat and poultry. The appliance comprises in a single hand held unit, one or more hollow needles through which liquid such as baste or tenderizer is injected into the meat or poultry, a reservoir which accommodates the liquid, and a pump, which pumps the liquid from the reservoir through the injection needles.

3 Claims, 5 Drawing Figures

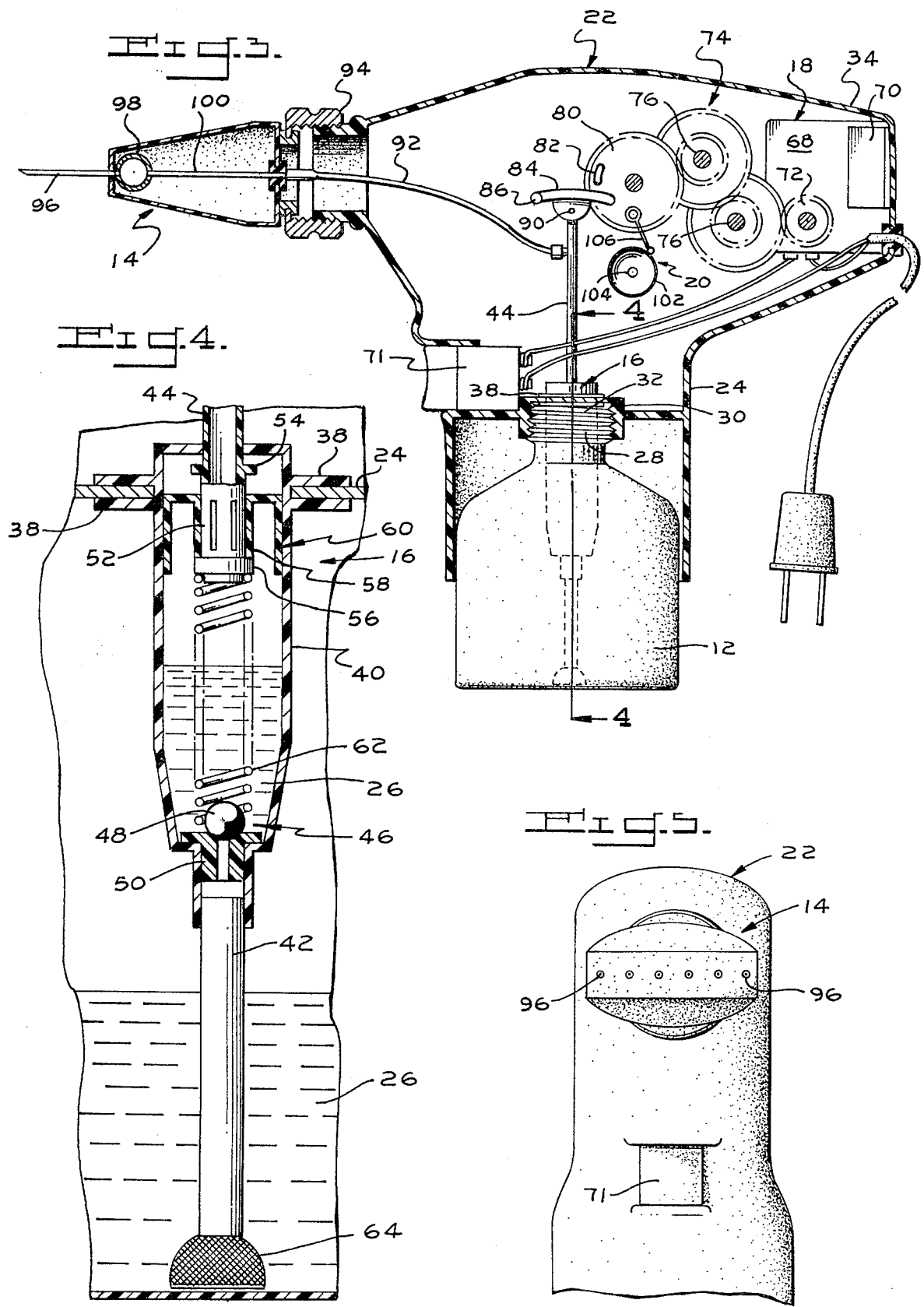

DOMESTIC APPLIANCE FOR THE LIQUID INJECTION OF MEAT

BACKGROUND OF THE INVENTION

For some time now, it has been a commercial practice in the processing of meat products to inject basting material into the meat. For the most part, poultry have been so treated to render the meat more juicy and tasty. However, the basting material often used in processing such fowl include various ingredients such as glycerides, salts, polysorbate, artificial color and flavorings, oils, and other materials which many find unwholesome, unappetizing and unhealthy. Thus, it is often impossible to purchase meats processed with such wholesome basting material as butter and the like. Furthermore, in the commercial processing of self-basting poultry, it is most often the practice to inject the basting material into the body portion of the fowl and not into the legs or wings thereof. As a result, while the breast or white meat of the bird may be satisfactorily pre-basted, the wings and legs may be rendered overly dry by cooking.

With regard to other meats, such as beef, pork, wild game and the like, the less expensive cuts of such meat and wild game often tend to be overly dry and tough. Heretofore, such cuts of meat in a pre-basted form have been unavailable. Therefore, a device by which one can baste, marbleize or tenderize such meat prior to the cooking thereof would be desirable. While apparatus with which meat can be basted prior to cooking are disclosed in U.S. Pat. Nos. 2,674,179 to Harrington, 3,507,207 to Rogers et al and 3,814,077 to Lumby et al, such apparatus were generally developed for the commercial processing of meat and due to such factors as lack of compactness and economy, are unsuitable for domestic use. While U.S. Pat. No. 2,887,035 to De Seversky discloses a device for injecting seasoning into meat either prior or subsequent to cooking, this device is adapted for the insertion of cut, dried seasoning rather than the injection of a fluid such as basting material into the meat.

It is, therefore, a principal object of the present invention to provide an apparatus for domestic use in injecting any desired liquid such as basting material and tenderizer into poultry, wild game, and meats of various types.

It is another object of the present invention to provide such an apparatus which is economical in construction, light in weight and capable of one handed operation.

It is another object of the present invention to provide such an apparatus which may be employed to inject a liquid suspension of spices into meat.

It is another object of the present invention to provide such an apparatus with such versatility as to enable a user thereof to inject controlled amounts of basting material and the like uniformly throughout various cuts of meat or fowl.

It is another object to provide such an apparatus which does not require high air pressure, hot water or refrigeration in its operation as do prior art commercial apparatus of a like nature.

It is another object to provide such an apparatus which is easily disassembled for cleaning.

SUMMARY OF THE INVENTION

The present invention relates to an apparatus for domestic use in injecting meat and poultry with liquids such as basting material, tenderizer, or liquid suspensions of spices and the like prior to cooking of the meat. The apparatus, includes in a single hand held unit, a reservoir for the liquid, a pump, the inlet of which is receivable within the liquid reservoir, and a plurality of hollow injection needles in fluid communication with the outlet of the pump. The needles are readily insertable into the meat to any desired depth and provide a liquid conduit connecting the outlet of the pump to the interior of the meat.

DESCRIPTION OF THE DRAWINGS

The above and other objects of the present invention will become more readily apparent from the following detailed description taken in connection with the accompanying drawing in which:

FIG. 3 is a sectional view taken along line 3—3 of FIG. 2;

FIG. 4 is an enlarged sectional view taken along line 4—4 of FIG. 3, and

FIG. 5 is a front elevated view thereof.

DESCRIPTION OF THE PREFERRED EMBODIMENT

Figure 1:
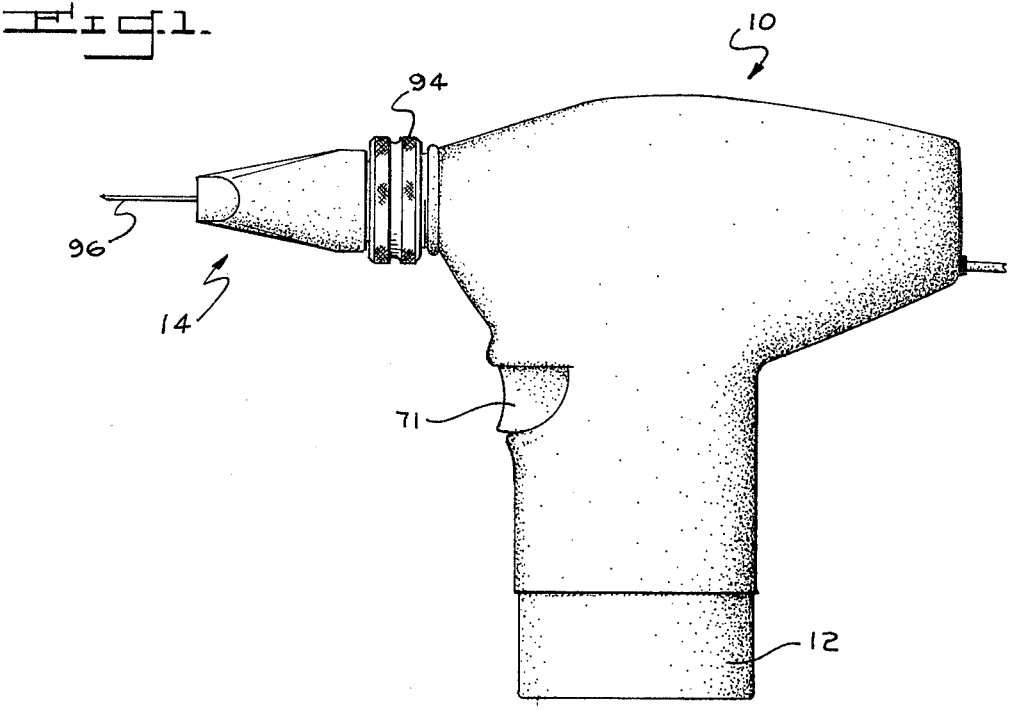
FIG. 1 is an elevated side view of the appliance of the present invention.
Figure 2:
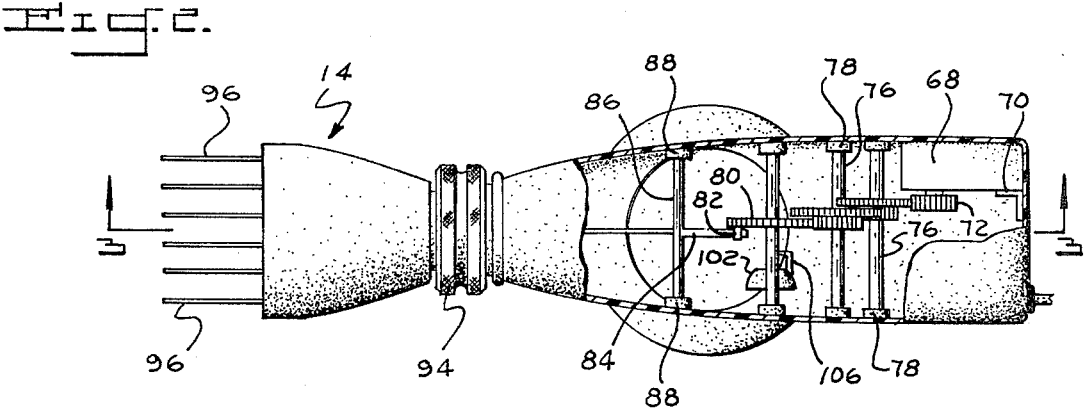
FIG. 2 is a partially sectioned top view thereof.

Referring to the drawing the appliance of the present invention is shown generally at 10 and includes a reservoir 12 for the liquid to be injected into the meat, an injection needle head 14 through which the liquid is injected into the meat and a pump 16 (FIG. 3) which forces the liquid into the meat through the injection needle head. The apparatus may also include means 18 for driving the pump and an alarm 20 which signals the user when a predetermined amount of liquid has been injected into the meat, the drive means, pump and alarm being enclosed within a housing 22 which includes operating handle 24. In operation, the injection needle head is inserted into the meat or poultry, the driving means 18 activated and the liquid pumped through the needles into the meat. After a predetermined amount of liquid is pumped into the meat, the alarm sounds, indicating to the user that the injection needle head should be moved to another portion of the meat or fowl. This procedure is followed until the entire piece of meat or fowl has been treated.

Referring to FIG. 1, the reservoir may be formed from plastic, glass, stainless steel or any other suitable material which will contain liquid 26, such as melted butter, baste or tenderizer, without corroding and which is easily cleanable. As shown, the upper portion of the reservoir is screw threaded at 28 and thus sealed by engagement of threads 28 with mating threads 30 and lid plate 32 formed in housing 22.

Housing 22 is formed from any suitable rigid material such as aluminum, high-impact plastic or the like and, for enhanced appearance of the appliance as a whole, may be formed from the same material as that employed in reservoir 12. In addition to the handle and threaded portions discussed hereinabove, the housing includes a main portion 34 which houses and supports pump drive means 18 and may, therefore, take on any desired shape as dictated by the required enclosure volume and desired appearance.

The pump, in the preferred embodiment, is mounted on lid plate 32 as by a snap or interference fit between the lid plate and mounting flanges 38. The pump is of the reciprocating type including a main housing 40, inlet tube 42 and an outlet tube 44 which also functions as an operating shaft (FIG. 3). The housing communicates with the inlet tube via an inlet ball valve 46 including a ball element 48 and a mating seat 50. The operating shaft includes a slotted end portion 52, the slots communicating with the interior of the shaft, and further includes first and second shoulders 54 and 56. Shoulder 54 limits the upward movement of shaft 44 by abutment with the upper portion of housing 40. Shoulder 56 engages both the inner skirt 58 of plunger 60, which is slidable on shaft 44, and the upper end of return spring 62.

Operation of the pump is as follows: A quantity of liquid 26 is maintained in housing 40 by normal operation of the pump. When operating shaft 44 is depressed, the shaft will slide downwardly through plunger 60 until shoulder 54 engages the top of the plunger thereby exposing the slots in end portion 52 to the interior of the pump chamber. Continued downward movement of shaft 44 causes shoulder 54 to depress plunger 60 thereby reducing the interior volume of housing 40 and causing the liquid in the housing to be forced through shaft 44 by way of the slots in end 52 and ultimately into the meat being treated. It will be understood that as the plunger is forced downwardly, return spring 62 is compressed. When the shaft reaches the limit of its downward stroke it is temporarily disengaged from the drive means and return spring 62 forces the shaft upwardly, the shaft sliding through skirt 58 until shoulder 56 engages the bottom of the skirt which seals the slots in end 52. Therefore, as the shaft and plunger move upwardly, a vacuum will be created in housing 40, this vacuum causing the suction of liquid through inlet tube 42 lifting ball 48 off its seat and filling the chamber.

The free end of inlet tube 42 may be provided with a strainer 64 which prevents over-size solids such as spices or coagulated basting material from entering the pump housing and fouling the pump.

While a reciprocating pump is shown, it will be understood that any of various other types of small pumps may be employed in this invention. However, where the appliance is to be powered by hand, a reciprocating pump has been found to be most convenient to operate.

The pump is powered by any suitable means and, as set forth hereinabove, may be powered by hand. In the preferred embodiment, the pump is powered by an electric motor 68 mounted on a bracket 70 which is mounted on the back wall of the housing. The motor is actuated by a trigger switch 71 mounted in the handle. The motor shaft has a drive pinion 72 mounted thereon, the pinion operatively engaging a reduction gear set 74 which allows the appliance to be operated at high motor speeds thereby maximizing the torque output of the motor. The gears of gear set 74 are mounted on shafts 76 suspended between bearings 78 which are fixed to the side wall of the housing. The last driven gear 80 of the set is provided on the side surface thereof with a cam 82 which traverses a circular path as that gear rotates. A pivotal follower or rocker arm 84 is mounted on shaft 86 supported on bearings 88 and is pinned at 90 (FIG. 3) to pump operating (outlet) shaft 44. It will be understood, therefore, that cam 82 will periodically, throughout a portion of its circular path traversal, engage follower 84, pivoting the follower downwardly (clockwise in FIG. 1) thereby actuating the pump.

Liquid is pumped from the pump through a flexible tube 92 and into injection needle head 14 removably attached to the housing for cleaning by threaded coupling 94. The flexibility of this tube continuously allows it to adapt to the movement of operating shaft (outlet tube) 44 while maintaining the fluid connection of that shaft with head 14. This head comprises a plurality of parallel, sharpened hollow needles 96 extending from, and in fluid communication with a manifold 98 which receives the liquid through manifold inlet tube 100 coupled to a flexible tube 92. The needles are dimensioned so as to accommodate baste and tenderizing liquids such as butter and the like including such liquids have suspended therein various ground or powdered flavorings and seasonings. Therefore, it will be observed that as operating shaft 44 is reciprocated, the liquid will be pumped through flexible tube 92, manifold inlet tube 100, manifold 98 and through each of needles 96 at substantially equal rates.

To insure that the meat is evenly treated with the baste or tenderizing liquid, alarm 20 alerts the user that a specific amount of the liquid has been injected into any one location on the meat. To this end, alarm 20 comprises in the preferred embodiment a bell 102 mounted on shaft 104 disposed below and generally parallel to the mounting shaft of gear 80. The bell is sounded by a clapper 106. The alarm is actuated by the periodic engagement of cam 82 with clapper 102 during a portion of the circular cam travel, this engagement causing the clapper to be pivoted away from the bell and thereafter released, striking the bell under its own weight. Actuation of the alarm will alert the user that the pump has completed one stroke and that the appliance should be reinserted into a neighboring area of the meat for uniform treatment thereof.

Thus, it will be appreciated that the domestic meat injecting appliance of the present invention enables the consumer to pre-baste, and tenderize any fresh meat or fowl at the interior thereof in a manner which heretofore was available only to commercial meat processors. The appliance is characterized by an economy of construction and simplicity of operation which render it readily affordable and convenient to use.

Having thus described in detail a preferred embodiment of the present invention, it will be obvious to persons skilled in the art that certain equivalent structure may be substituted for that which has already been described; and it is, therefore, intended that all such equivalent substitutions be covered as they are embraced within the spirit and scope of the appended claims.

What is claimed is:

1. In a domestic technique for conditioning a food product by means of an injection thereinto of a conditioner, the improvement comprising a unitary handheld assemblage consisting of:
- a walled housing (22) having a lowermost downwardly-depending open-ended reservoir-receiving encasement with a threaded opening through the housing wall centrally of the encasement,
- a conditioner reservoir (12) having an uppermost exteriorly-threaded neck circumscribing an outlet and being receivable within the encasement for a sealed threaded interengagement with the housing wall opening, a reciprocating pump means (16) including a pump housing (40) and a lower inlet tube (42) communicating with the pump housing via a valved opening (42) and a depressible upper slotted outlet tube/operator (44), the pump means being held relative to the reservoir by the insertion of the pump housing and tube into the reservoir, an inlet ball valve arrangement (48,50) for regulating communication between the pump housing and tube, a plunger (60) within the pump housing and circumscribing the shaft, a return spring (62) disposed between the shaft and valve arrangement, a shoulder (54) circumscribing the shaft for limiting shaft for limiting shaft upward movement and controlling plunger downward movement, an electric motor (68) within the housing for powering the pump means, a cam driven by the motor, a follower in operative engagement with the operating tube and cyclically engageable and disengageable from the cam for driving the pump, an energizing switch (71) for activating the motor, a manifold (98) within the housing, a conduit (92) fluidically connecting between the outlet of the pump means and manifold, and a plurality of injection needles (96) each communicating with the manifold and projecting outwardly therefrom for insertion into the food product, all adapted and arranged for cyclical operation whereby depression of the operator (44) under return spring compression drives the operator downwardly through plunger (60) for exposition of the operator slotting to the pump housing interior with continued downward driving of the operator effecting depression of the plunger (60) by the shoulder (54) in a volume-reducing motion for forcing a charge of the conditioner within the pump housing through the slotting and into the operator and outwardly thereof via the conduit (92) to the manifold (98) and needles (96) while effecting disengagement of the operator from the drive means on completion of the downward stroke for the upward return of the operator under urging of the return spring and with the operator shifting into a slot-sealing position while creating a vacuum in the housing for sucking the conditioner through the inlet tube 42 and lifting the valve from its seat and filling the pump housing with a next in-seriatim charge of the conditioner.

2. In the assemblage of claim 1 including, a signal means periodically energized by the motor for indicating a cycle termination and the sufficiency of a predetermined flow of the conditioning material through the needles.

3. In the assemblage of claim 1, the signal means comprising a striker cyclically operated by the cam and a percussion device sounded by the striker.

* * * * *